United States Patent
Maeda

(10) Patent No.: US 8,432,595 B2
(45) Date of Patent: Apr. 30, 2013

(54) SCANNING IMAGE DISPLAYER, MOBILE PHONE, MOBILE INFORMATION PROCESSOR, AND MOBILE IMAGER

(75) Inventor: Ikuo Maeda, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 237 days.

(21) Appl. No.: 12/958,056

(22) Filed: Dec. 1, 2010

(65) Prior Publication Data

US 2011/0157668 A1 Jun. 30, 2011

(30) Foreign Application Priority Data

Dec. 28, 2009 (JP) ................................. 2009-297341
Oct. 25, 2010 (JP) ................................. 2010-238200

(51) Int. Cl.
*G02B 26/08* (2006.01)

(52) U.S. Cl.
USPC ....................................................... 359/205.1

(58) Field of Classification Search ............... 359/205.1, 359/206.1, 662
See application file for complete search history.

(56) References Cited

U.S. PATENT DOCUMENTS 6,980,367 B2 * 12/2005 Yamamoto .................... 359/662
2004/0075914 A1 4/2004 Yamamoto 2007/0024981 A1 2/2007 Duncan et al.
2007/0176851 A1 8/2007 Willey et al.
2008/0204385 A1 8/2008 Slutsky

FOREIGN PATENT DOCUMENTS

| CN | 101233442 A | 7/2012 |
|---|---|---|
| JP | 2006-186243 A | 7/2006 |
| JP | 4174420 B2 | 8/2008 |
| JP | 2008-275930 A | 11/2008 |
| JP | 2009-3429 A | 1/2009 |
| JP | 2009-122455 A | 6/2009 |
| JP | 4564681 B2 | 8/2010 |
| WO | WO 2007/016199 A2 | 2/2007 |
| WO | WO 2009/088446 A1 | 7/2009 |

* cited by examiner

*Primary Examiner* — Euncha Cherry
(74) *Attorney, Agent, or Firm* — Dickstein Shapiro LLP

(57) ABSTRACT

A scanning image displayer, including a beam provider emitting a laser beam; a beam scanner including a two-dimensional drive deflecting mirror, deflectively scanning the beam in a main scanning direction and a sub-scanning direction; and an optical element including a reflection surface before the two-dimensional drive deflecting mirror, deflecting the beam in a direction of the two-dimensional drive deflecting mirror such that the beam obliquely enters a mirror thereof. The two-dimensional drive deflecting mirror deflectively scans the beam to project the beam onto a surface to be projected, and the light intensity of the beam is controlled according to image information to form an image. A flat surface of a substrate where the mirror is formed is located parallel or almost parallel to an optical axis of the beam, and the reflection surface is located so as not to receive the beam deflectively scanned by the two-dimensional drive deflecting mirror.

5 Claims, 10 Drawing Sheets

FIG. 1
(a)
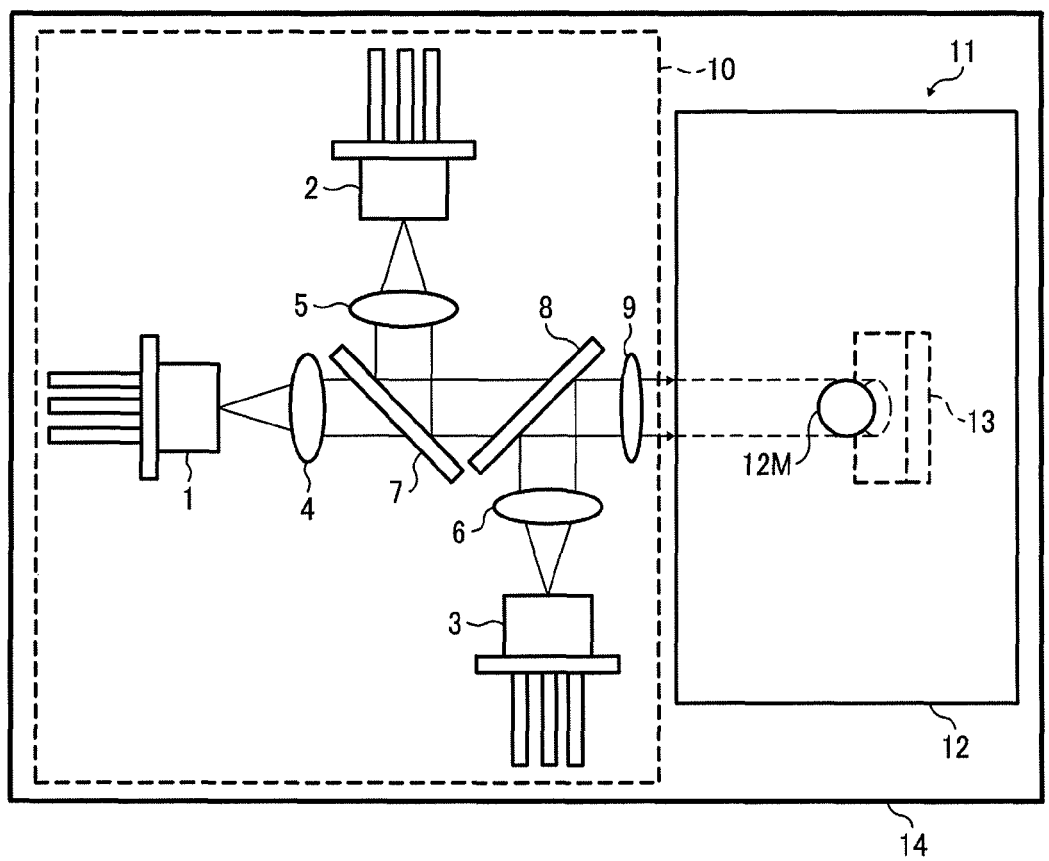
(b)
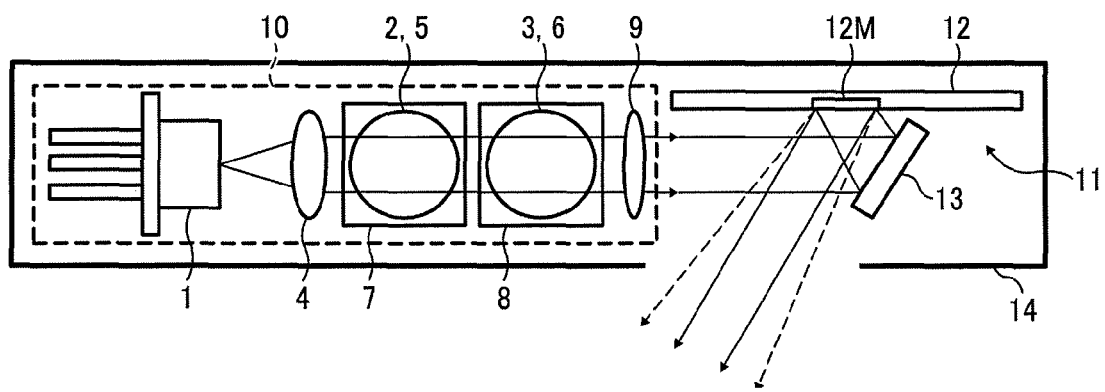

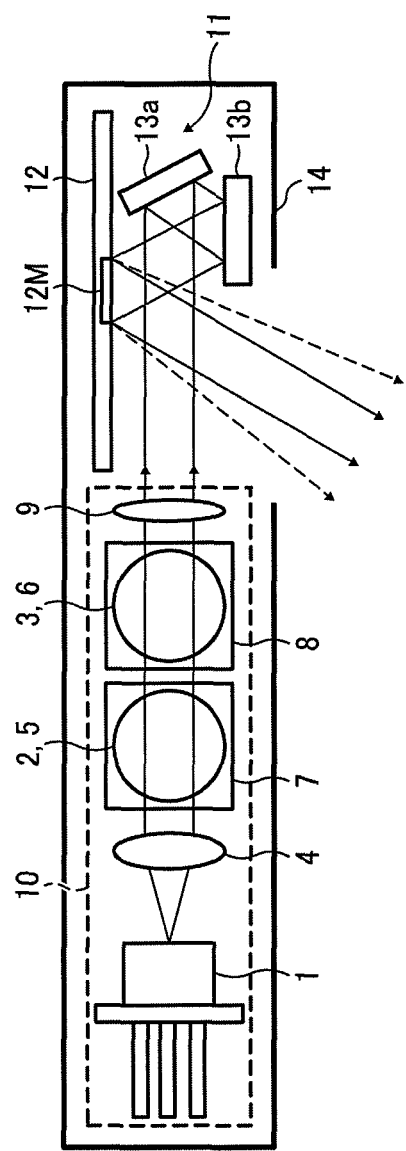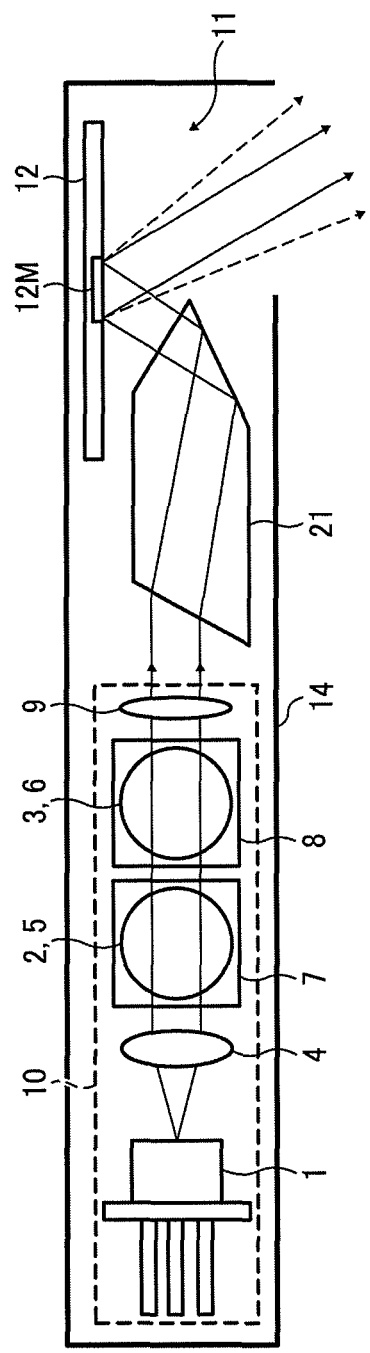

(a)      (b)

FIG. 16
(a) A BEAM SPLITTER WHEN A CONVENTIONAL MIRROR IS USED
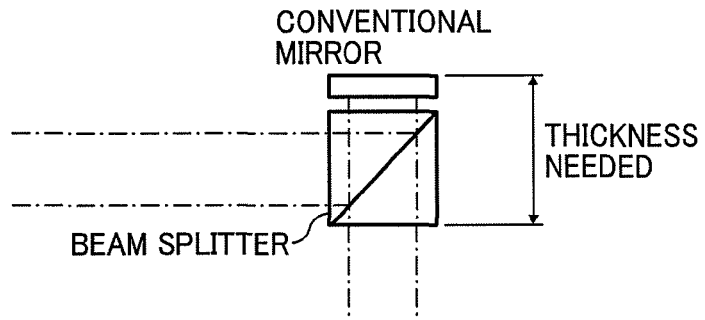
(b) A BEAM SPLITTER WHEN A DEFLECTING MIRROR IS USED
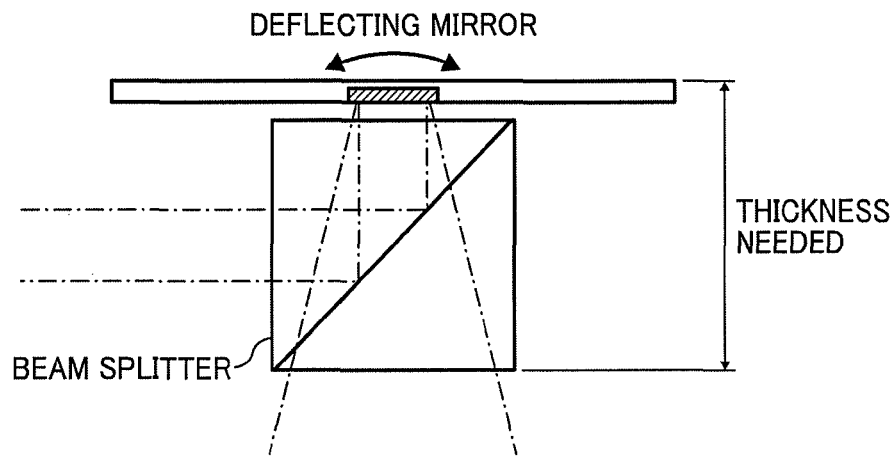
(c) A MIRROR TYPE BEAM SPLITTER WHEN A DEFLECTING MIRROR IS USED
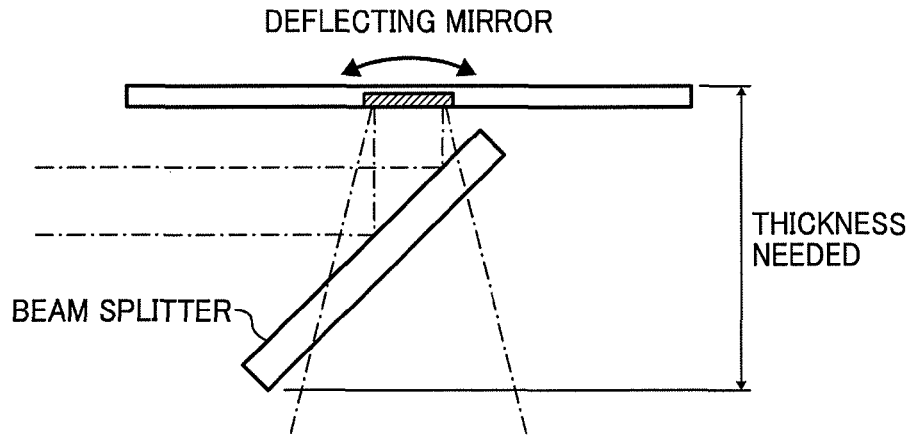

SCANNING IMAGE DISPLAYER, MOBILE PHONE, MOBILE INFORMATION PROCESSOR, AND MOBILE IMAGER

BACKGROUND OF THE INVENTION

1. Field of the Invention

The present invention relates to a scanning image displayer applicable for projectors and mobile projectors, and more particularly to an ultracompact scanning image displayer scanning a laser beam with a minute deflecting mirror to display an image on a surface onto which the laser beam is projected. Further, the present invention relates to a mobile phone, a mobile information processor such as a notebook PC, a mini notebook PC and a mobile PCs, and a mobile imager such as a digital camera and digital video camera.

2. Description of the Background Art

Compact scanning image displayers, i.e., laser projectors deflectively scanning a laser beam from side to side and up and down with a minute deflecting mirror and controlling an emission power of the laser beam at the same time to display images are now being developed. Since the laser projectors have much smaller sizes than conventional projectors having light sources, image display panels, and projection lenses, they are expected to be installed in mobile phones, mobile image processors such as notebook PCs, mini notebook PCs and mobile PCs, and mobile imagers such as digital cameras and digital video cameras.

However, they are still too large for practical use, e.g., the current OPT module has a size of from 4 to 6 cc, and particularly when they are installed in mobile phones their thickness of about 7 mm is a major hurdle.

Japanese Patent No. 4174420 shows a basic light path configuration of a laser projector in FIG. 14, in which a beam emitted from a laser light source is projected onto a screen through a first mirror deflecting in a main scanning direction and second mirror deflecting in a sub-scanning direction to form an image. The laser light source is a monochromatic light source, and not a color light source.

Japanese published unexamined application No. 2008-275930 synthesizes colors with a dichroic prism before a deflecting mirror in FIG. 1, in which W (white) is added besides the three primary colors R (red), G (green) and B (blue), but W is not indispensable. Further, it is considerably difficult to synthesize R, G, B, and W with a dichroic prism.

Japanese published unexamined application No. 2009-003429 synthesizes colors with an X prism and uses a two-dimensional deflecting mirror in FIG. 22. The X prism and the two-dimensional deflecting mirror considerably downsize the projector.

Japanese published unexamined application No. 2009-122455 discloses a configuration including two color laser light sources R and G in a CAN in FIG. 3, in which light paths can be shortened more than the projector including three color laser beams in separate CANS. The G laser is a combination of an infrared laser and a SHG generating a second harmonic wave in FIG. 3. Thus is because an LD of G suitable for projector applications is currently unobtainable, and an LD of G is thought to replace the combination in future. In addition, providing a condenser lens after a deflecting mirror is not indispensable.

Japanese published unexamined application No. 2006-186243 discloses a 1CAN3LD type including three color laser light sources R, G, and B in a CAN. This is, so to speak, an ultimate compact projector including only one light source (1CAN3LD), one condenser lens (CL) and one two-dimensional deflecting mirror. This is a very simple configuration, but includes difficult technologies to realize, such as 1CAN3LD.

As mentioned above, various light paths have been considered, and the deflecting mirrors are commonly arranged diagonally to a beam optical axis. This seems natural because the beam is reflected, but is a large hurdle to overcome to achieve greater compactness of the projector.

In consideration of downsizing the scanning image displayer (laser projector), two single-deflection deflecting mirrors in Japanese Patent No. 4174420 and Japanese published unexamined application No. 2008-275930 are noticeably disadvantageous, whereas a two-dimensional drive deflecting mirror is definitely used for a laser projector aiming at compactness.

FIG. 11 is a schematic view illustrating a principled configuration example of a two-dimensional drive deflecting mirror.

On a deflecting mirror substrate 12, a sub-scanning power generator 12d, a sub-scanning rotational axis 12b, a main scanning power generator 12c and a main scanning rotational axis 12a are connected with each other in this order from the outside in, and a deflecting mirror 12M is located at the center. The power generators 12d and 12c may be a solenoid-operated system, a piezo system, or other. Any of them needs a certain level of size, and the rotational axes 12a and 12b need a certain length as well, although depending on rotational angles and speeds. Only the deflecting mirror 12M at the center is optically necessary, but the deflecting mirror substrate 12 needs to be several times larger than the deflecting mirror 12M to two-dimensionally drive the deflecting mirror 12M. Although depending on the performance required for the deflecting mirror, the deflecting mirror substrate 12 needs to be at least five times larger in a main scanning direction and four times larger in a sub-scanning direction than the deflecting mirror 12M. This largely affects a total thickness of the scanning image displayer (laser projector) and is a barrier against thinning.

The two-dimensional deflecting mirror needs to be located in a direction to be thinner to thin the laser projector. However, when the two-dimensional deflecting mirror is located in a direction to be thinner, a reflection surface of the two-dimensional deflecting mirror and a optical axis of the laser beam from a light source become parallel to each other, and the laser beam does not enter the reflection surface of the two-dimensional deflecting mirror.

Therefore, a beam splitter shown in FIG. 16 (a) is typically used when the laser beam and the reflection surface are parallel to each other. As shown in FIG. 16 (a), the beam splitter bends the laser beam at a right angle at a separation surface (45° surface) and directs the beam to the reflection surface. The laser beam after being reflected is transmitted through the separation surface to be taken out.

Since the beam splitter needs to have a separation surface having both transmissivity and reflectivity, it may be simply a half mirror. However, in order to avoid light quantity loss, a so-called deflection beam splitter having a deflection separation film as a separation surface is used, when deflection status needs to change with reciprocation on a light path with a combination of a $\gamma/4$ plate (quarter wave plate), etc.

Since the beam splitter can bend the beam at a right angle and direct the beam to the two-dimensional drive deflecting mirror, the two-dimensional drive deflecting mirror can be located parallel to the optical axis and it may be thought that the laser projector can be thinner, but this is impractical. This is because the laser beam is oscillated by the two-dimensional drive deflecting mirror in the laser projector.

As shown in FIG. 13 (a), when the laser beam is not oscillated by the mirror, the beam splitter has only to have a size of a beam diameter+α. However, in the laser projector, as shown in FIGS. 13 (b) and 13 (c), all the laser beams oscillated by the two-dimensional drive deflecting mirror need to have such sizes as can be included in the beam splitter, and not only the width but also the thickness enlarge. Therefore, even the beam splitter cannot thin the laser projector.

For these reasons, a need exists for a scanning image displayer having such a thickness as can be installed in mobile phones.

SUMMARY OF THE INVENTION

Accordingly, an object of the present invention is to provide a scanning image displayer having such a thickness as can be installed in mobile phones.

Another object of the present invention is to provide a mobile phone using the scanning image displayer.

A further object of the present invention is to provide a mobile information processor using the scanning image displayer.

Another object of the present invention is to provide a mobile imager using the scanning image displayer.

These objects and other objects of the present invention, either individually or collectively, have been satisfied by the invention of a scanning image displayer, comprising:

a beam provider configured to emit a laser beam;

a beam scanner comprising a minute two-dimensional drive deflecting mirror, configured to deflectively scan the laser beam emitted from the beam provider in a main scanning direction and a sub-scanning direction; and an optical element comprising a reflection surface before the two-dimensional drive deflecting mirror, configured to deflect the laser beam emitted from the beam provider in a direction of the two-dimensional drive deflecting mirror such that the laser beam obliquely enters a mirror of the two-dimensional drive deflecting mirror, wherein the two-dimensional drive deflecting mirror deflectively scans the laser beam emitted from the beam provider to project the laser beam to a surface to be projected, and the light intensity of the laser beam is controlled in accordance with image information to form an image, a flat surface of a substrate where the mirror of the two-dimensional drive deflecting mirror is formed is located parallel or almost parallel to an optical axis of the laser beam emitted from the beam provider, and the reflection surface is located so as not to receive the laser beam deflectively scanned by the two-dimensional drive deflecting mirror.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 1 is a schematic view illustrating a basic embodiment of the scanning image displayer (laser projector) of the present invention, wherein (a) is a top view thereof and (b) is a side view thereof;

FIG. 8 is a schematic side view illustrating another embodiment of the scanning image displayer (laser projector) of the present invention;

FIG. 9 is a schematic side view illustrating a further embodiment of the scanning image displayer (laser projector) of the present invention;

FIG. 12 is a schematic view illustrating an embodiment of a mobile phone, the outer wall of a cover of which the scanning image displayer (laser projector) of the present invention is placed on;

FIG. 13 is a schematic view illustrating an embodiment of a mobile phone, the inner wall of a cover of which the scanning image displayer (laser projector) of the present invention is placed on;

FIG. 14 is a schematic view illustrating an embodiment of a mobile phone, which the scanning image displayer (laser projector) of the present invention is placed on;

FIG. 15 (b) is a schematic view illustrating an embodiment of a mobile phone, which the scanning image displayer (laser projector) of the present invention is placed in to be drawn from the mobile phone only when used; and FIG. 16 is an explanatory view when a laser beam enters a mirror or a deflecting mirror located parallel to a optical axis of the laser beam through a conventional beam splitter.

DETAILED DESCRIPTION OF THE INVENTION

Figure 2:
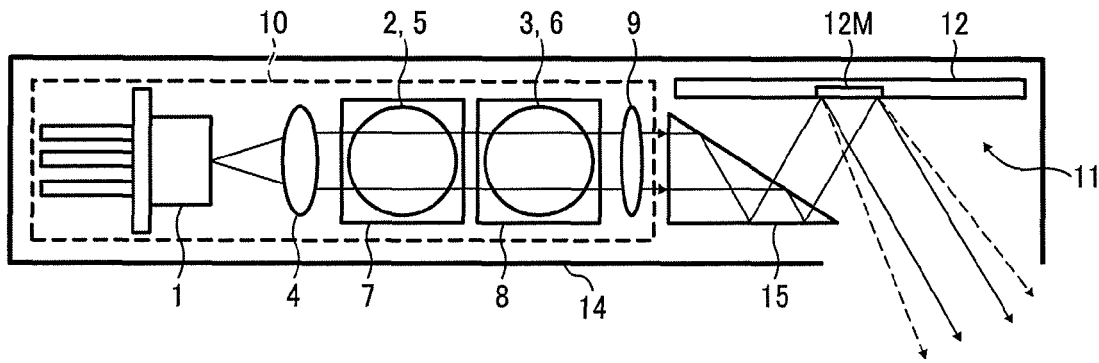
FIG. 2 is a schematic side view illustrating another embodiment of the scanning image displayer (laser projector) of the present invention.

The present invention provides a scanning image displayer having such a thickness as can be installed in mobile phones. Particularly, the present invention relates to a scanning image displayer, comprising:

a beam provider configured to emit a laser beam;

a beam scanner comprising a minute two-dimensional drive deflecting mirror, configured to deflectively scan the laser beam emitted from the beam provider in a main scanning direction and a sub-scanning direction; and an optical element comprising a reflection surface before the two-dimensional drive deflecting mirror, configured to deflect the laser beam emitted from the beam provider in a direction of the two-dimensional drive deflecting mirror such that the laser beam obliquely enters a mirror of the two-dimensional drive deflecting mirror, wherein the two-dimensional drive deflecting mirror deflectively scans the laser beam emitted from the beam provider to project the laser beam to a surface to be projected, and the light intensity of the laser beam is controlled in accordance with image information to form an image, a flat surface of s substrate where the mirror of the two-dimensional drive deflecting mirror is formed is located in parallel or almost parallel with a optical axis of the laser beam emitted from the beam provider, and the reflection surface is located so as not to receive the laser beam deflectively scanned by the two-dimensional drive deflecting mirror.

Hereinafter, the embodiments of the present invention will be explained in detail, referring to the drawings.

[Embodiment 1]

FIG. 1 is a schematic view illustrating a basic embodiment of the scanning image displayer (laser projector) of the present invention, and (*a*) is a top view thereof and (*b*) is a side view thereof.

In FIGS. 1 (*a*) and 1 (*b*), the scanning image displayer (laser projector) includes a beam provider 10 emitting a laser beam with a light source and an optical system (surrounded with a dashed line on the left side of the drawing), and a beam scanner 11 having a minute two-dimensional drive deflecting mirror deflectively scanning the laser beam emitted from the beam provider 10 in a main scanning direction and a sub-scanning direction (surrounded with a dashed line on the right side of the drawing). The beam provider 10 and the beam scanner 11 are contained in a housing 14. A laser beam emitted from the beam provider 10 is deflectively scanned by the two-dimensional drive deflecting mirror 12M to project the laser beam onto a surface to be projected (not shown), and the light intensity of the laser beam is controlled in accordance with image information to form an image on the surface.

More specifically, the beam provider 10 includes three LDs (typically having wavelengths for light's three primary colors, R (red), Green (g) and Blue (blue), respectively) 1, 2 and 3; coupling lenses (CL) 4, 5 and 6 for the respective LDs, dichroic mirrors 7 and 8, and a condenser lens (DL) 9. Laser beams emitted from the LDs having the respective wavelengths 1, 2 and 3 are almost parallelized by the respective coupling lenses (CL) 4, 5 and 6, subjected to color synthesis by the dichroic mirrors 7 and 8, converted to a beam so as form a spot having a suitable size on a surface to be projected (not shown such as screens), and the beam is transmitted to the beam scanner 11.

Figure 11:
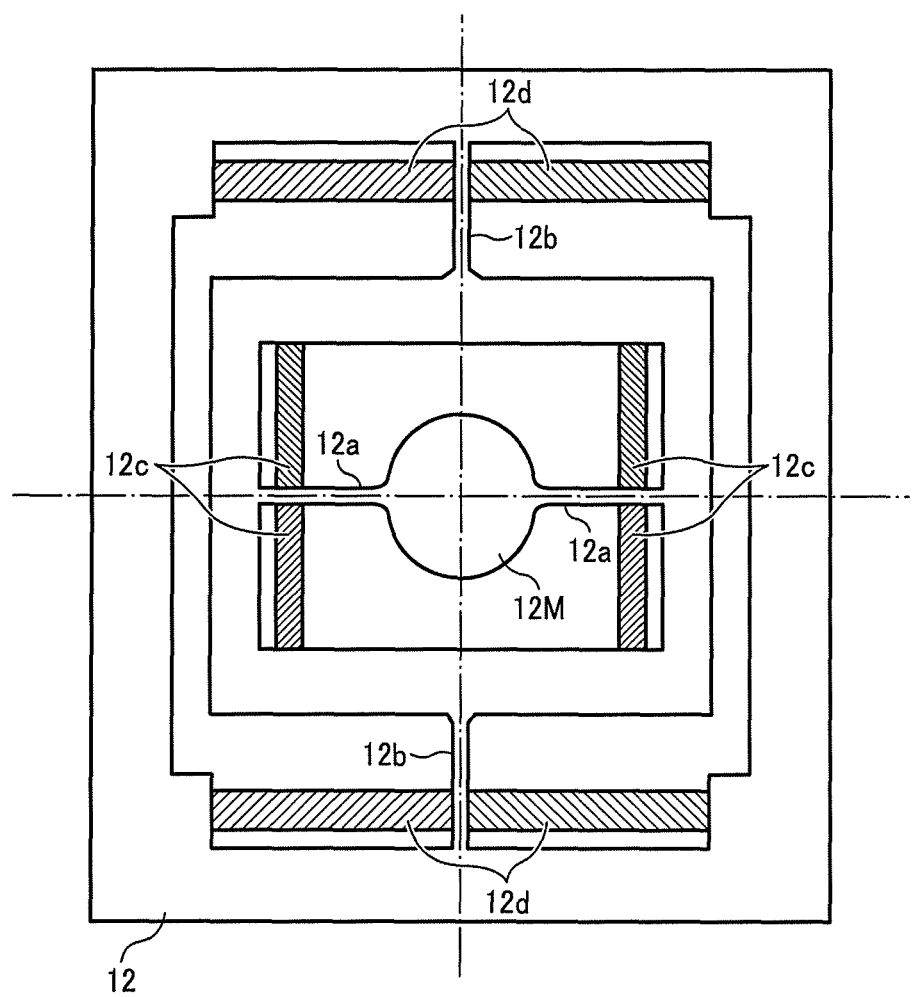
FIG. 11 is a schematic view illustrating a principled configuration example of a two-dimensional drive deflecting mirror.

The beam scanner 11 is formed of a two-dimensional drive deflecting mirror located such that a flat surface of a mirror substrate 12 having the deflecting mirror 12M is parallel (or almost parallel) to the optical axis of the laser beam from the beam provider 10, the two-dimensional drive deflecting mirror has the same configuration as that in FIG. 11.

The mirror substrate 12 is processed by MEMS (micro electro mechanical systems) to form the two-dimensional drive deflecting mirror including the deflecting mirror 12M, a main scanning rotational axis 12*a*, a sub-scanning rotational axis 12*b*, a drive beam of a main scanning power generator 12*c*, and a drive beam of a sub-scanning power generator 12*d* in a body. The deflecting mirror 12M has a reflection surface formed of a silicon (Si) substrate a metallic thin film such as aluminum is formed on. The drive beams of the main scanning power generator 12*c* and the sub-scanning power generator 12*d* have plate-shaped unimorph structures, and drive source members such as piezoelectric members for electromagnetic methods, piezoelectric methods, etc. are layered on one side of the drive beams.

In FIG. 1, before the two-dimensional drive deflecting mirror of the beam scanner 11 (the side the laser beam emitted from the beam provider 10 enters), an optical element (a flat mirror in FIG. 1) 13 is located, having at least one reflection surface deflecting the laser beam emitted from the beam provider 10 in a direction of the mirror 12M of the two-dimensional drive deflecting mirror such that the laser beam obliquely enters the mirror 12M. The reflection surface of the optical element 13 is located so as not to receive light deflectively scanned by the mirror 12M of the two-dimensional drive deflecting mirror. The laser beam transmitted from the beam provider 10 to the beam scanner 11 is deflected by the flat mirror 13 such that the laser beam obliquely enters the mirror 12M, and the beam is two-dimensionally scanned thereby in a main-scanning direction and a sub-scanning direction and projected to a surface to be projected (not shown) such as screens. The light intensity of the laser beam of the beam provider 10 is controlled in accordance with image information to form an image on the surface.

The essence of the present invention is the beam scanner 11. The flat substrate the deflecting mirror 12M of the two-dimensional drive deflecting mirror is formed on is located parallel to a optical axis of the laser beam provided from the beam provider 10. Before the two-dimensional drive deflecting mirror, an optical element (a flat mirror 13) is located, having at least one reflection surface deflecting the laser beam emitted from the beam provider 10 in a direction of the mirror 12M of the two-dimensional drive deflecting mirror such that the laser beam obliquely enters the mirror 12M. The reflection surface of the flat mirror 13 is located so as not to receive light deflectively scanned by the mirror 12M of the two-dimensional drive deflecting mirror. Namely, the reflection surface of the flat mirror 13 is located such that the laser beam deflected by the reflection surface enters the deflecting mirror 12M at an oblique incident angle about 30°, and out of a range of a maximum deflection angle (width) of the deflected scanning light from the mirror 12M of the two-dimensional drive deflecting mirror. The light deflectively scanned by the mirror 12M of the two-dimensional drive deflecting mirror does not return to the reflection surface of the flat mirror 13. Since the beam is not reflected by the reflection surface, the laser beam emitted from the beam provider 10 is efficiently projected and the scanning image displayer can be thinner.

The beam provider 10 is not limited to the configuration in FIG. 1, conventional configurations, their combinations or other configurations may be used.

[Embodiment 2]

FIG. 2 is a schematic side view illustrating another embodiment of the scanning image displayer (laser projector) of the present invention. A beam provider 10 surrounded with a dashed line has the same configuration as that in FIG. 1 and explanations thereof is omitted.

A flat surface of a substrate 12 a deflecting mirror 12M of a two-dimensional drive deflecting mirror is located parallel or almost parallel to a optical axis of a laser beam emitted from a beam provider 10. Before the two-dimensional drive deflecting mirror (the side the laser beam emitted from the beam provider enters), as an optical element having at least one reflection surface deflecting the laser beam emitted from the beam provider 10 in a direction of the mirror 12M of the two-dimensional drive deflecting mirror such that the laser beam obliquely enters the mirror 12M, a triangular prism 15 is located. Two reflection surfaces of the triangular prism 15 are located so as not to receive light deflectively scanned by the mirror 12M of the two-dimensional drive deflecting mirror. The two reflection surface of the triangular prism 15 are located such that the laser beam deflected by the reflection surface enters the deflecting mirror 12M at an oblique incident angle about 30°, and out of a range of a maximum deflection angle (width) of the deflected scanning light from the mirror 12M of the two-dimensional drive deflecting mirror.

A beam transmitted from the beam provider 10 vertically enters one of the surfaces of the triangular prism 15, totally reflects on the first oblique reflection surface, reflects on the second under reflection surface (mirror surface), vertically passes the oblique surface, and reaches the mirror 12M of the two-dimensional drive deflecting mirror. The beam is two-dimensionally scanned by the deflecting mirror 12M in a main-scanning direction and a sub-scanning direction, and projected to a surface to be projected (not shown) such as screens. The light intensity of the laser beam of the beam provider 10 is controlled in accordance with image information to form an image on the surface.

Figure 3:
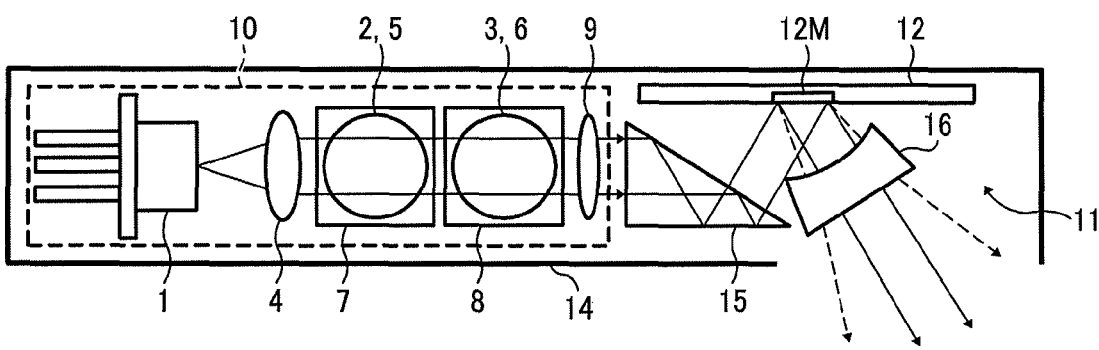
FIG. 3 is a schematic side view illustrating a further embodiment of the scanning image displayer (laser projector) of the present invention.

The triangular prism 15 in FIG. 2 is slightly more expensive than the flat mirror 13 in FIG. 1, but is an effective means when scanning a beam with a lens after the two-dimensional drive deflecting mirror (the side the beam deflected by the deflecting mirror 12M is emitted from) as shown in FIG. 3.

FIG. 3 illustrates a further embodiment in which an optical element (such as convex lenses) 16 having such a curved surface as further increases the deflection of the laser beam by the mirror 12M of the two-dimensional drive deflecting mirror is located thereafter in FIG. 2.

The convex lens 16 enlarges the deflection angle of the laser bema by the deflecting mirror 12M, and can enlarge an image with the same deflection angle while the deflection angle of the deflecting mirror 12M can be small to form an image having the same size.

In FIG. 3, instead of the convex lens 16, various optical elements can be used according to applications, such as aspheric lenses decreasing distortion.

[Embodiment 3]

Figure 4:
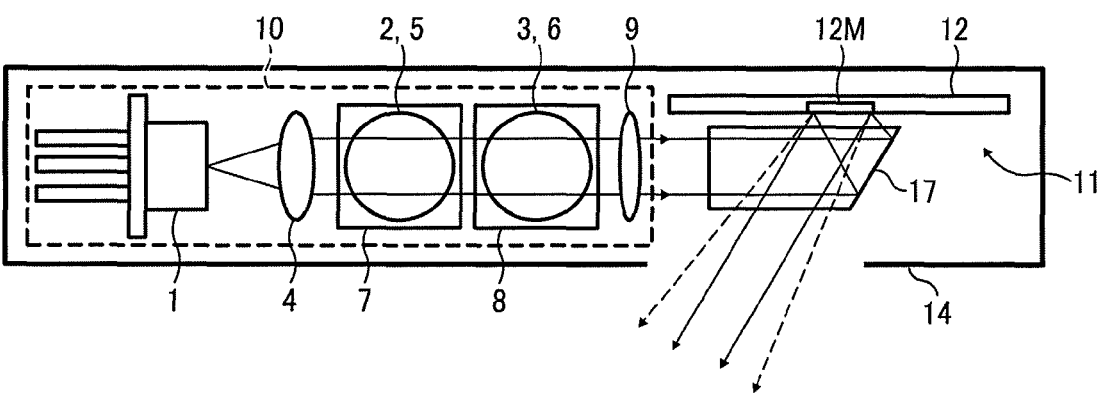
FIG. 4 is a schematic side view illustrating another embodiment of the scanning image displayer (laser projector) of the present invention.

FIG. 4 is a schematic side view illustrating another embodiment of the scanning image displayer (laser projector) of the present invention. A beam provider 10 surrounded with a dashed line has the same configuration as that in FIG. 1 and explanations thereof is omitted.

A flat surface of a substrate 12 a deflecting mirror 12M of a two-dimensional drive deflecting mirror is located parallel or almost parallel to a optical axis of a laser beam emitted from a beam provider 10. Before the two-dimensional drive deflecting mirror (the side the laser beam emitted from the beam provider enters), as an optical element having at least one reflection surface deflecting the laser beam emitted from the beam provider 10 in a direction of the mirror 12M of the two-dimensional drive deflecting mirror such that the laser beam obliquely enters the mirror 12M, a reflection surface is located. The reflection surface is located so as not to receive light deflectively scanned by the mirror 12M of the two-dimensional drive deflecting mirror. In addition, after the two-dimensional drive deflecting mirror, a curved surface further increasing the deflection of the laser beam thereby is located. The reflection surface before the two-dimensional drive deflecting mirror and the curved surface thereafter are integrally formed in one optical element 17.

In FIG. 4, a prism is used as the optical element 17. One of the surfaces of the prism 17 is a reflection surface having the same function as that of the flat mirror in FIG. 1. A beam from the beam provider 10 vertically enters the prism 17, reflects on the reflection surface, and obliquely enters the deflecting mirror 12M of the two-dimensional drive deflecting mirror. The beam is two-dimensionally scanned by the deflecting mirror 12M in a main-scanning direction and a sub-scanning direction, and projected to a surface to be projected (not shown) such as screens through the prism 17. The light intensity of the laser beam of the beam provider 10 is controlled in accordance with image information to form an image on the surface.

Figure 5:
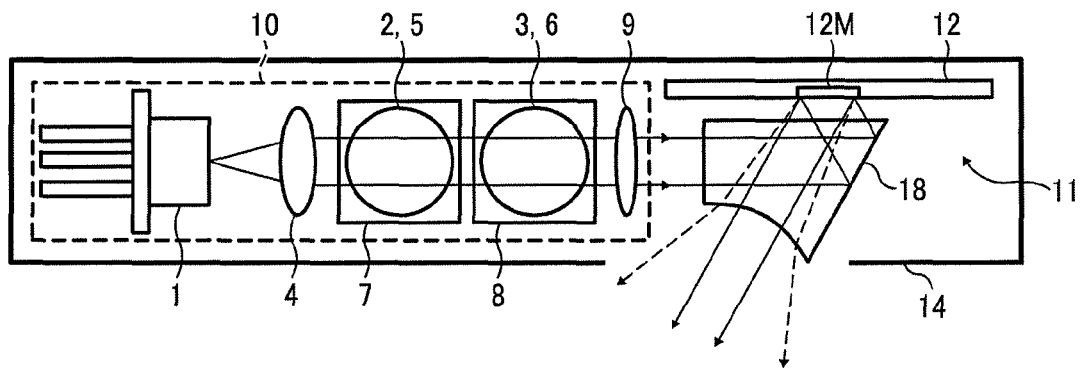
FIG. 5 is a schematic side view illustrating a further embodiment of the scanning image displayer (laser projector) of the present invention.
Figure 6:
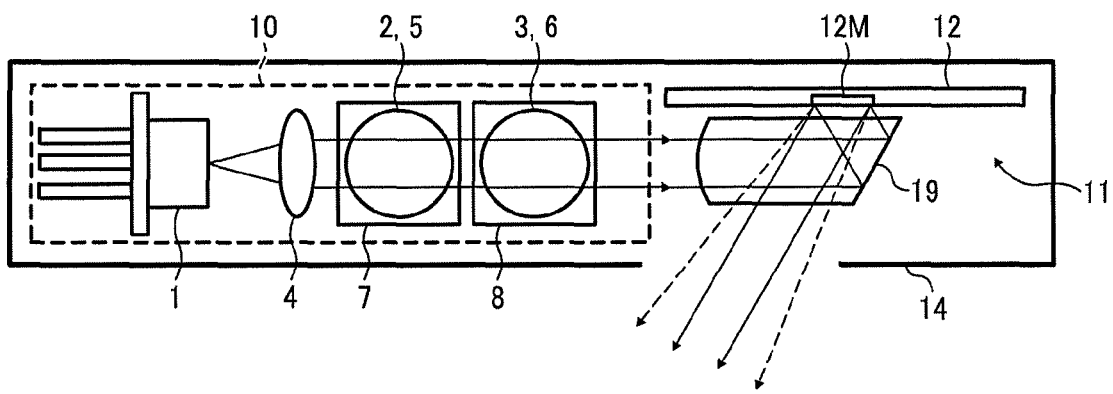
FIG. 6 is a schematic side view illustrating another embodiment of the scanning image displayer (laser projector) of the present invention.
Figure 7:
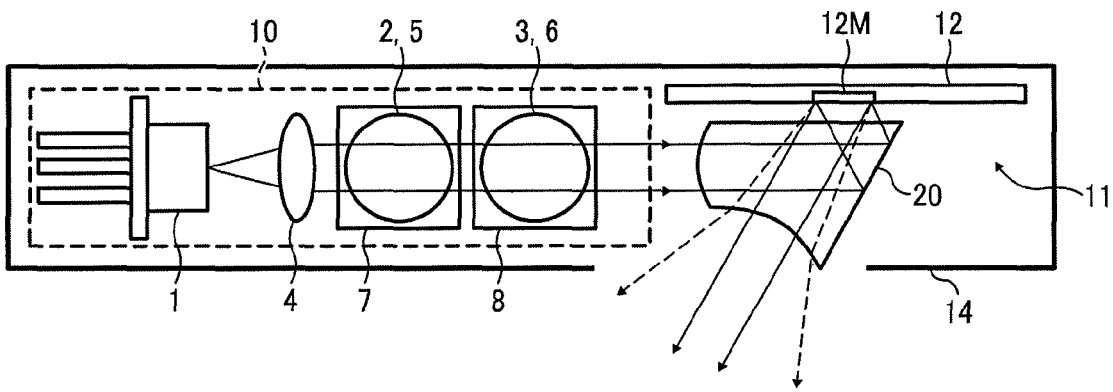
FIG. 7 is a schematic side view illustrating a further embodiment of the scanning image displayer (laser projector) of the present invention.

The prism 17 in FIG. 4 is slightly more expensive than the flat mirror 13 in FIG. 1, but as shown in FIGS. 5 to 7, a prism can have various functions when modified to an optical element, e.g., 18 to 20 each having a surface with a power besides the reflection surface.

[Embodiment 4]

FIG. 5 is a schematic side view illustrating a further embodiment of the scanning image displayer (laser projector) of the present invention, in which an emitting surface of a prism 18 of a beam scanner 11 has the shape of a convex lens. One optical element has the same function as that in FIG. 3 to increase a deflection angle of a deflecting mirror 12M.

FIG. 6 is a schematic side view illustrating another embodiment of the scanning image displayer (laser projector) of the present invention, in which a beam incident surface of a prism 19 a beam from a beam provider 10 of a beam scanner 11 enters has the shape of a convex lens. Since the prism 19 of the beam scanner 11 has a light-collecting capability, a condenser lens (DL) 9 of the beam provider 10 can be omitted.

FIG. 7 is a schematic side view illustrating a further embodiment of the scanning image displayer (laser projector) of the present invention, in which an optical element 20 having both functions of the prisms in FIGS. 5 and 6. The shape of a prism is modified to a multifunctional optical element.

Besides, as optical elements each having a reflection surface before a two-dimensional drive deflecting mirror, various elements can be considered, such as a combination of plural flat mirrors 13a and 13b in FIG. 8 and polygon-shaped prisms 21. The best optical elements may be used in consideration of cost, size and performance.

In either case, the flat substrate 12 the deflecting mirror 12M of the two-dimensional drive deflecting mirror is formed on is located parallel or almost parallel to a optical axis of the laser beam emitted from the beam provider 10. Before the two-dimensional drive deflecting mirror, an optical element is located, having at least one reflection surface deflecting the laser beam emitted from the beam provider 10 in a direction of the mirror 12M of the two-dimensional drive deflecting mirror such that the laser beam obliquely enters the mirror 12M. The reflection surface of the optical element is located so as not to receive light deflectively scanned by the mirror 12M of the two-dimensional drive deflecting mirror. The light deflectively scanned by the mirror 12M of the two-dimensional drive deflecting mirror does not return to the reflection surface of the optical element. The laser beam emitted from the beam provider 10 is efficiently projected and the scanning image displayer can be thinner.

The limit of the thinness is "a beam diameter+the thickness of the two-dimensional drive deflecting mirror+α". α is a wall of the housing 14, a parts attaching allowance, etc.

Figure 10:
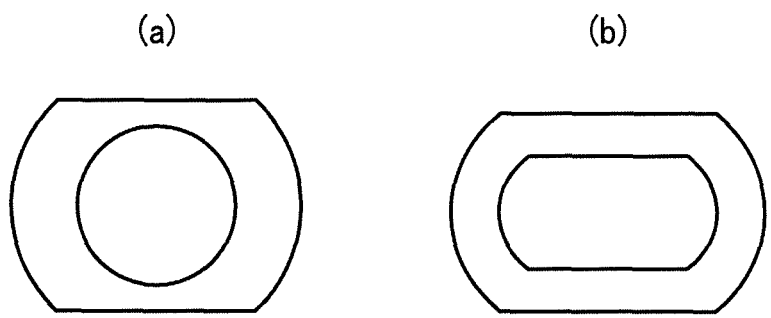
FIG. 10 is a schematic view illustrating a CAN-shaped embodiment of LD for use in the scanning image displayer (laser projector) of the present invention.

However, when the projector is thin, a CAN thickness of an LD which is a light source is dominant to the thickness, and the shape of the CAN needs to be oval as shown in FIGS. 10 (a) and 10 (b).

An incident angle of the beam to the deflecting mirror 12M of the two-dimensional drive deflecting mirror is typically 30°, but is not limited thereto.

The projector can be thinnest when the flat substrate 12 the deflecting mirror 12M of the two-dimensional drive deflecting mirror is formed on is located parallel to a optical axis of the laser beam emitted from the beam provider 10, but the flat substrate of the two-dimensional drive deflecting mirror may be inclined within an allowance of thickness.

[Embodiment 5]

Next, embodiments of devices equipped with the thin scanning image displayer (laser projector) of the present invention will be explained.

FIGS. 12 to 15 show various embodiments of mobile phones equipped with the scanning image displayer (laser projector) of the present invention.

Figure 12:
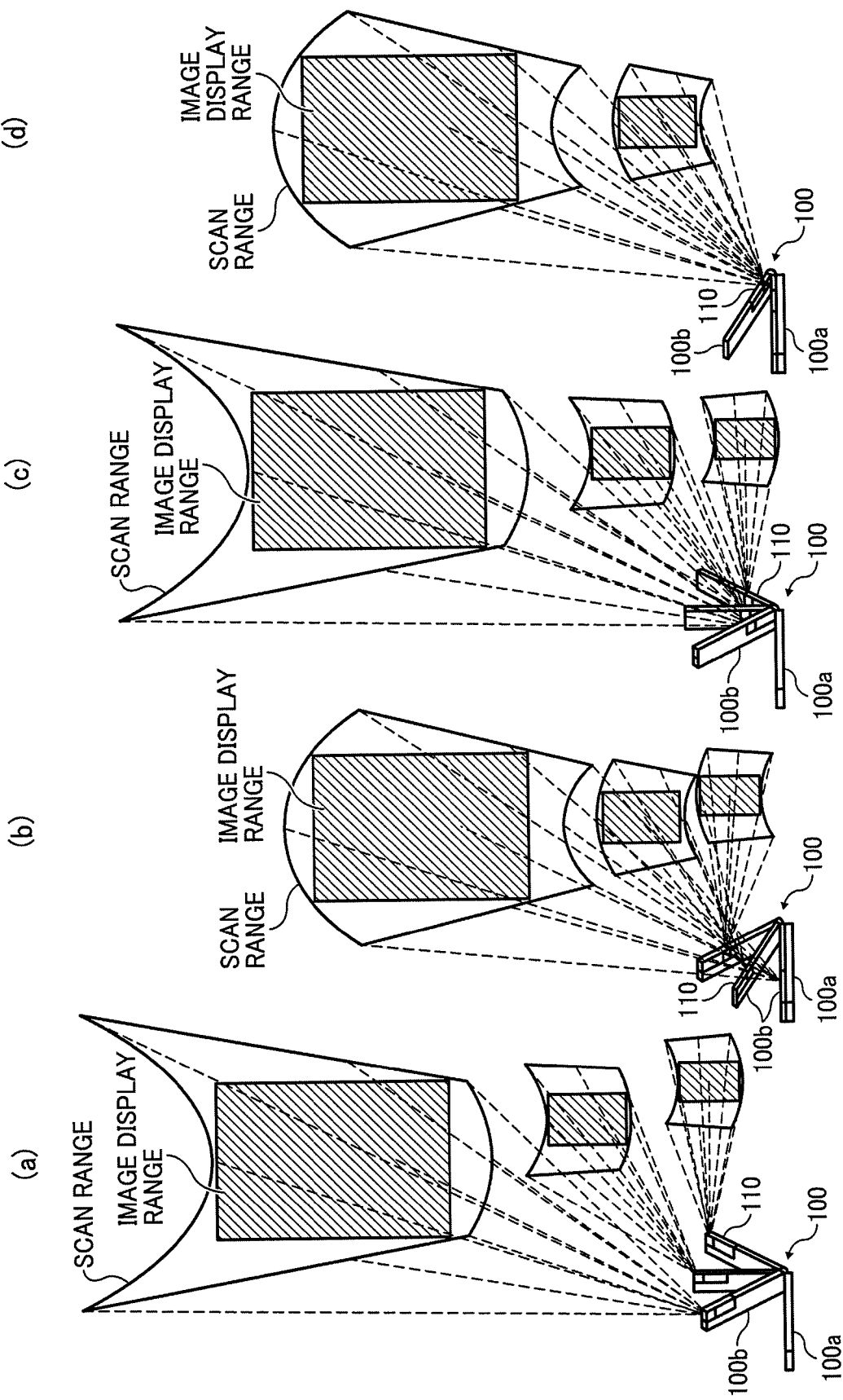

FIG. 12 is an embodiment in which the laser projector 110 of the present invention is placed on an outer wall of a cover 100b of a mobile phone 100.

In FIG. 12 (a), the laser projector 110 is placed at the top of the outer wall of the cover 100b, and a beam projector is placed at the top. In FIG. 12 (b), the laser projector 110 is placed at the top of the outer wall of the cover 100b, and a beam projector is placed at the center. In FIG. 12 (c), the laser projector 110 is placed at the bottom of the outer wall of the cover 100b, a beam projector is placed at the center. In FIG. 12 (d), the laser projector 110 is placed at the bottom of the outer wall of the cover 100b, a beam projector is placed at the bottom.

When the laser projector 110 is placed on the outer wall of the cover 100b of the mobile phone 100, an opening and closing angle of the cover 100b are changed to freely change the projection angle and the size of image display range as shown in FIG. 12.

Figure 13:
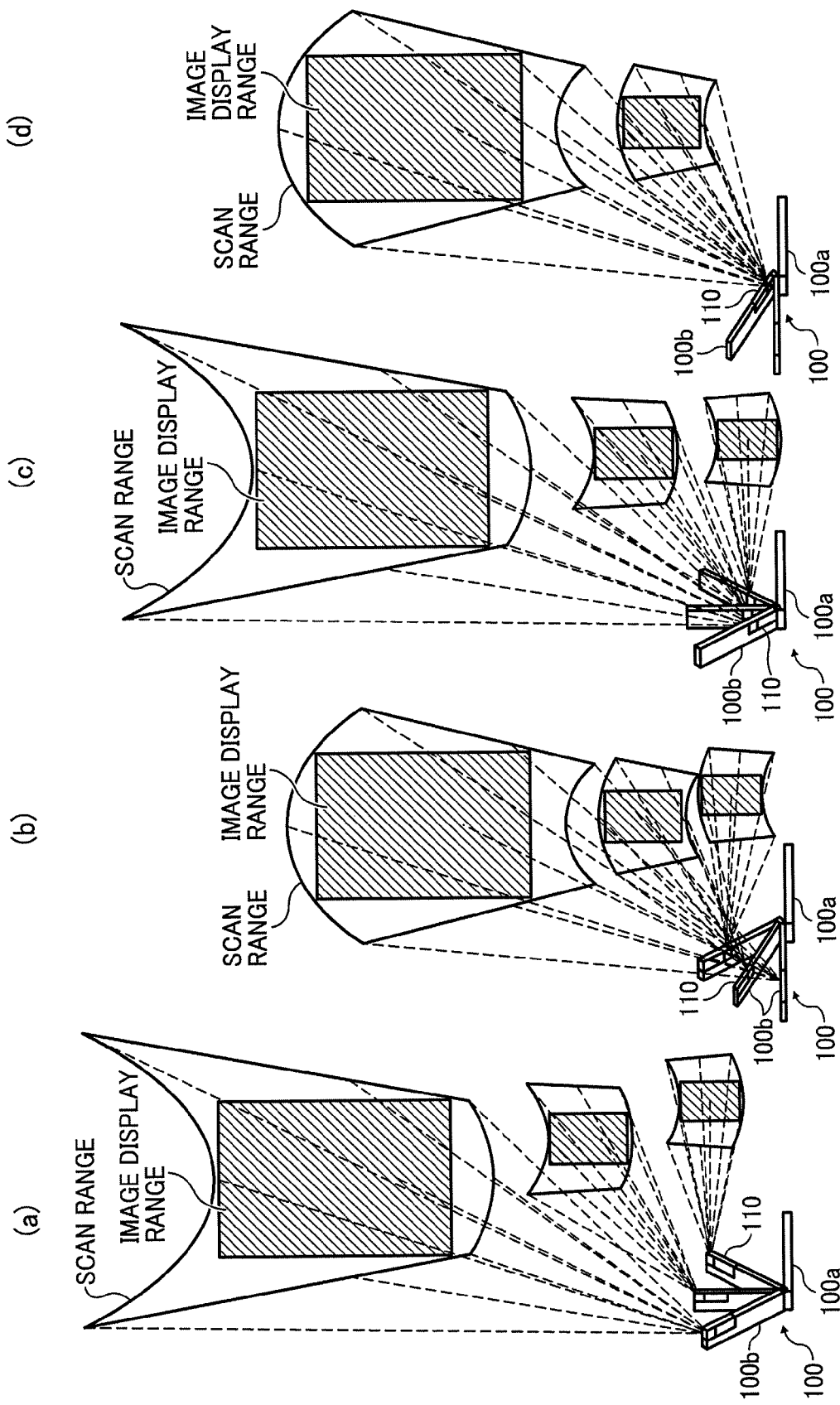

FIG. 13 is an embodiment in which the laser projector 110 of the present invention is placed on an inner wall of a cover 100b of a mobile phone 100.

In FIG. 13 (a), the laser projector 110 is placed at the top of the inner wall of the cover 100b, and a beam projector is placed at the top. In FIG. 13 (b), the laser projector 110 is placed at the top of the inner wall of the cover 100b, and a beam projector is placed at the center. In FIG. 13 (c), the laser projector 110 is placed at the bottom of the inner wall of the cover 100b, a beam projector is placed at the center. In FIG. 13 (d), the laser projector 110 is placed at the bottom of the inner wall of the cover 100b, a beam projector is placed at the bottom.

Even when the laser projector 110 is placed on the inner wall of the cover 100b of the mobile phone 100, an opening and closing angle of the cover 100b are changed to freely change the projection angle and the size of image display range as shown in FIG. 13.

Figure 14:
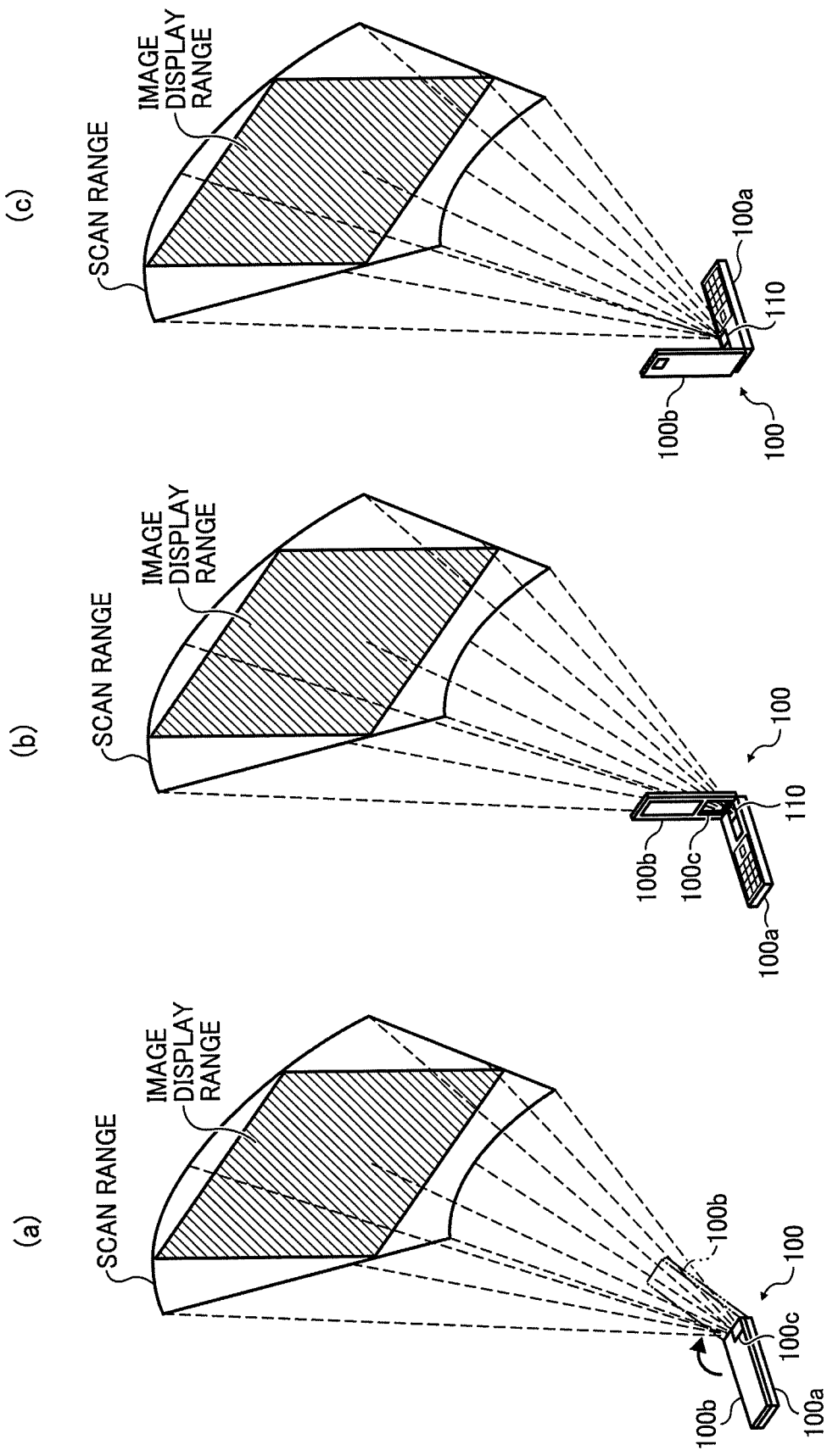

FIG. 14 is an embodiment in which the laser projector 110 of the present invention is placed on a main body 100a of a mobile phone 100.

In FIG. 14 (a), when a cover 100b of the mobile phone 100 is closed, a beam may be projected through a minute window 100c formed on the cover 100b.

When the cover 100b is opened at an angle not less than 135°, a beam can be projected without interference of the cover. In FIG. 14 (b), when the laser projector 110 is placed at a side of a hinge connecting the main body 100a with a cover 100b, a large window 100c is needed when the cover 100b is opened at an angle not greater than 90°. However, when the projection direction is a direction reverse to an opening direction of the cover 100b, a beam can be projected without interference of the cover.

Figure 15:
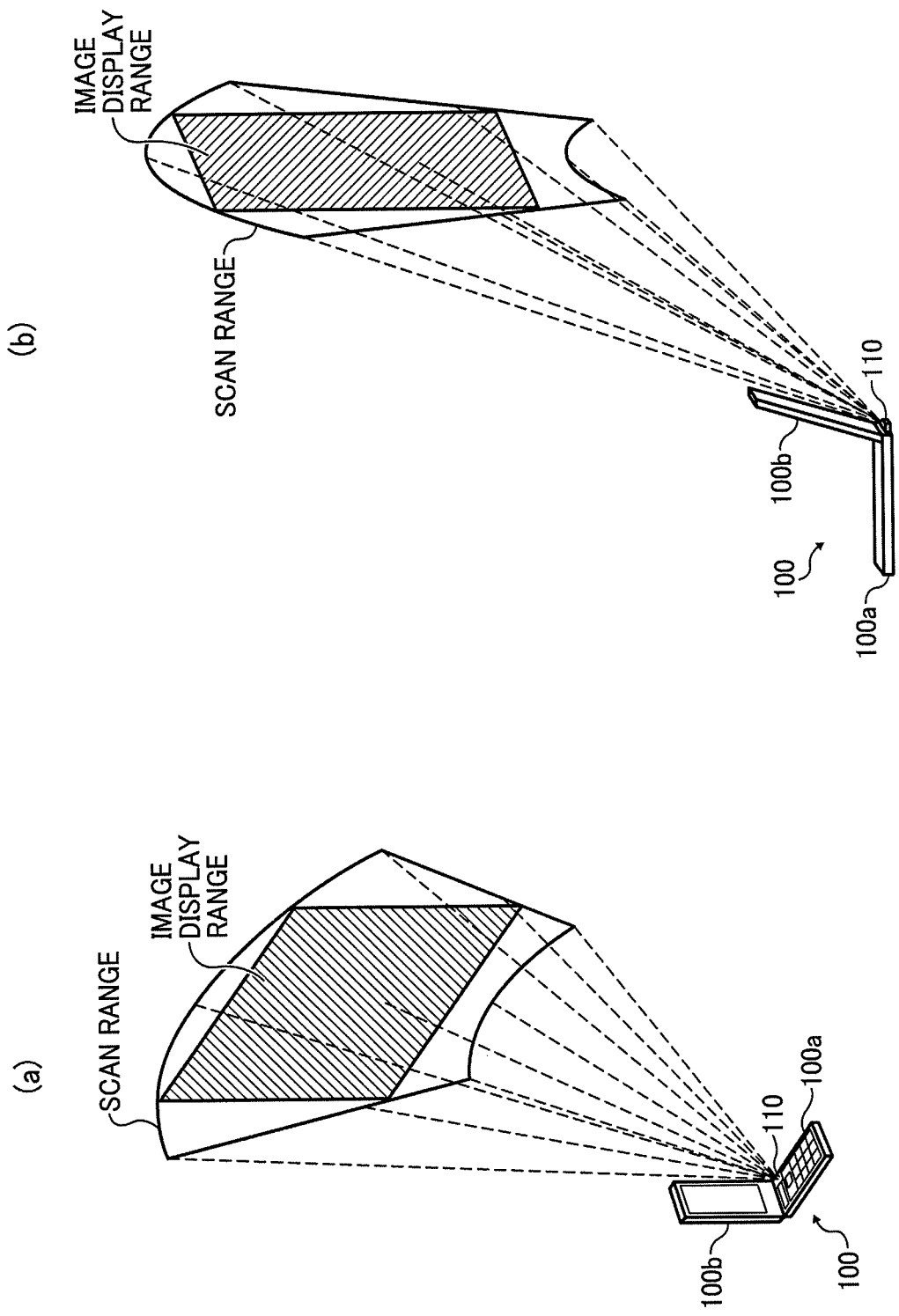
FIG. 15 (a) is a schematic view illustrating an embodiment of a mobile phone, which the scanning image displayer (laser projector) of the present invention is placed on to laterally project a laser.

FIG. 15 (a) is an embodiment in which the laser projector 110 of the present invention is placed on a main body 100a of a mobile phone 100 and a beam is projected in a side direction. When the beam is projected in a side direction, the beam can be projected without interference of a cover 100b even when opened at an angle of 90°.

FIG. 15 (b) is an embodiment in which the laser projector 110 of the present invention is placed in a main body 100a of a mobile phone 100 and the laser projector 110 is drawn from the main body 100a only when used, which makes it difficult for a cover 100b to interfere with the beam.

As mentioned above, the laser projector 110 of the present invention is very thin and easily installable on the main body 100a or the cover 100b of the mobile phone 100.

Further, the laser projector 110 of the present invention is easily installable on devices as large as or larger than the mobile phones as well, e.g., mobile information processors such as notebook PCs, mini notebook PCs and mobile PCs; and mobile imagers such as digital cameras and digital video cameras.

This application claims priority and contains subject matter related to Japanese Patent Applications Nos. 2009-297341 and 2010-238200, filed on Dec. 28, 2009, and Oct. 25, 2010, respectively, the entire contents of each of which are hereby incorporated by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A scanning image displayer, comprising:
a beam provider configured to emit a laser beam;
a beam scanner comprising a minute two-dimensional drive deflecting mirror; and
an optical element comprising a prism comprising a first surface, a second surface, a third surface and a fourth surface, configured such that the laser beam emitted from the beam provider enters the prism through the first surface, the laser beam having entered the prism is reflected on a reflection surface located on the second surface and is emitted from the prism through the third surface, the laser beam emitted from the prism enters the two-dimensional drive deflecting mirror, and the resulting deflectively scanned laser beam emitted from the two-dimensional drive deflecting mirror enters the prism through the third surface and is emitted from the prism through the fourth surface;
wherein the two-dimensional drive deflecting mirror is configured to deflectively scan the laser beam emitted from the prism in a main scanning direction and a sub-scanning direction and to project the deflectively scanned laser beam onto a surface to be projected, and a light intensity of the laser beam is controlled in accordance with image information to form an image,
a flat surface of a substrate where the mirror of the two-dimensional drive deflecting mirror is formed is located parallel or almost parallel to an optical axis of the laser beam emitted from the beam provider, and
the reflection surface of the prism is located so as not to receive the laser beam deflectively scanned by the two-dimensional drive deflecting mirror.

2. The scanning image displayer of claim 1, wherein the fourth surface comprises a curved surface configured to further increase the deflection of the laser beam.

3. A mobile phone, comprising the scanning image displayer according to claim 1.

4. A mobile image processor, comprising the scanning image displayer according to claim 1.

5. A mobile imager, comprising the scanning image displayer according to claim 1.

* * * * *